United States Patent [19]

Hartvigsen

[11] Patent Number: 5,340,664
[45] Date of Patent: Aug. 23, 1994

[54] THERMALLY INTEGRATED HEAT EXCHANGE SYSTEM FOR SOLID OXIDE ELECTROLYTE SYSTEMS

[75] Inventor: Joseph J. Hartvigsen, Kaysville, Utah

[73] Assignee: Ceramatec, Inc., Salt Lake City, Utah

[21] Appl. No.: 128,522

[22] Filed: Sep. 29, 1993

[51] Int. Cl.⁵ .............................. H01M 8/04
[52] U.S. Cl. .................... 429/20; 429/26; 429/34
[58] Field of Search ............ 429/19, 20, 26, 34, 429/30, 17; 165/152, 177, 181

[56] References Cited

U.S. PATENT DOCUMENTS

| | | |
|---|---|---|
| 3,810,509 | 5/1974 | Kun . |
| 3,907,028 | 9/1975 | Lawson . |
| 4,022,050 | 5/1977 | Davis et al. . |
| 4,029,146 | 6/1977 | Hart et al. . |
| 4,171,015 | 10/1979 | Bucey et al. . |
| 4,385,012 | 5/1983 | Priestley . |
| 4,481,975 | 11/1984 | Buckley . |
| 4,781,320 | 11/1988 | Fujiyoshi . |
| 4,854,380 | 8/1989 | Yoshida et al. . |
| 4,976,313 | 12/1990 | Dahlgren et al. . |

*Primary Examiner*—Anthony Skapars
*Attorney, Agent, or Firm*—Trask, Britt & Rossa

[57] ABSTRACT

A thermally integrated heat exchange system for solid oxide electrolyte systems includes a thermally insulated furnace enclosure structure having an internal chamber therein and a plurality of solid oxide electrolyte plates disposed within the internal chamber. A heat exchanger particularly suited for use with the thermally integrated system has gas passageways for the flow of gases therethrough and is associated with the walls of the furnace enclosure. Thermal energy radiated from an operational solid oxide electrolyte system within the furnace enclosure may be used to preheat incoming reactant gases destined for use by the electrolyte plates. Exchange of thermal energy between hot exhaust gases and cooler incoming gases may also occur in the heat exchanger gas passageways that are substantially thermally integrated along their length.

14 Claims, 6 Drawing Sheets

THERMALLY INTEGRATED HEAT EXCHANGE SYSTEM FOR SOLID OXIDE ELECTROLYTE SYSTEMS

FIELD

The present invention relates to heat exchangers for preheating incoming reactant gases fed to a solid oxide electrolyte system, and more particularly to a thermally integrated heat exchange system for solid oxide electrolyte systems.

STATE OF THE ART

Solid oxide based electrolyte systems are used in a variety of applications including solid oxide fuel cells (SOFCs) and gas concentrators. The SOFC converts potential chemical energy in reactant gases into electrical energy. Gas concentrators permit specific migration of a chemical species through the electrolyte plates. In both these systems, reactant gases are typically preheated before being fed to the solid oxide electrolyte elements.

In the SOFC, a fuel gas such as hydrogen or a short chain hydrocarbon is fed to the anode surface of the solid oxide fuel cell plates, and an oxygen containing gas, typically air, is fed to the cathode surface of the plates. The fuel gas is combusted in an electrochemical reaction that occurs across the fuel cell plates, the products being electrical energy and spent fuel and air exhaust. In a gas concentrator, a gas containing the desired chemical species in some form is fed to one electrode surface of the solid oxide electrolyte plates. At the electrode surface, an electrochemical reaction occurs that generates an ionic form of the desired chemical species. The ions migrate to the opposite side of the electrolyte plates where they are converted back to the non-ionic form. Since the electrode material only permits migration of the specific ion, the desired chemical species may be collected in pure form from the other side of the electrolyte plates. The exhaust gas from a gas concentrator is thus the original reactant gas which has been depleted of the particular migrating species.

Both the SOFC and the gas concentrator operate in the relatively high temperature range of 800-1000 C. Heat exchangers are used to preheat incoming reactant gases to prevent the gases from cooling the electrolyte plates below the operating temperature. Low operating temperature dramatically reduces the efficiency of the system. Heat exchangers, however, add a great deal of cost and complexity to the system. In the traditional process design, hot exhaust gas from the electrolyte plates is fed to the heat exchanger, and preheated reactant gas is received from the heat exchanger via costly insulated alloy piping. The heat exchanger and piping also require considerable installation and maintenance expense.

High temperature piping and heat exchangers are costly from the standpoint of heat loss as well. The piping and heat exchanger have considerable surface area where heat may be exchanged with the atmosphere. This heat is thus unavailable to preheat incoming gases.

A similar situation exists for the fuel processing system in a SOFC. Partially spent fuel gas is typically reprocessed or reformed to convert some of the reaction products into usable hydrocarbon feed. Steam reformation of hydrocarbons is endothermic and requires temperatures in excess of 750 C. to achieve complete conversion of the hydrocarbon feed. Most SOFC systems must burn a portion of the fuel for the purpose of supplying the heat of reaction for the reformation process. The high temperature reformer unit and associated piping also have considerable surface area subject to heat loss.

A need exists for a low cost, thermally integrated heat exchange system for solid oxide electrolyte systems that co-locates all high temperature processes in one enclosure. Further, a need exists for a heat exchanger suited for use with the thermally integrated system, and which may be adapted for use in conjunction with the particular operating conditions of the SOFC and other solid oxide electrolyte systems.

SUMMARY OF THE INVENTION

The thermally integrated heat exchange system of the instant application overcomes many of the aforementioned problems associated with heat exchangers for solid oxide electrolyte systems. Costly high temperature piping to and from the heat exchanger is not required because all high temperature processes associated with operation of a solid oxide electrolyte system are integral parts of a thermally insulated furnace enclosure structure. Electrochemical oxidation of fuel, air heat exchange and fuel reformation processes are all accomplished inside the insulated furnace enclosure structure. The lack of piping to and from the heat exchanger also substantially reduces costly heat exchange with the environment. Additionally, the complexity of a solid oxide electrolyte system, and manufacturing and maintenance expenses are all substantially reduced in the thermally integrated heat exchange system.

The furnace enclosure structure has an interior chamber where the solid oxide plates of the electrolyte system may be located. A heat exchanger for preheating an incoming reactant gas stream may be embedded in the walls of the furnace enclosure. A thermal insulating material may be applied to the exterior of the furnace enclosure to substantially confine heat radiating from the electrolyte system to the enclosure structure and substantially limit the exchange of thermal energy with the external environment. Another thermal insulating material may be applied to the interior surface of the furnace enclosure structure to concentrate and substantially confine heat to the heat exchanger disposed between the two thermal insulation layers. Heat generated from the internal resistance of the operating electrolyte plates and from the thermodynamics of electrochemical oxidation is transferred to the heat exchanger embedded in the walls of the furnace enclosure. Fuel reformation means used in SOFC applications may also be disposed within the interior chamber of the furnace enclosure.

The thermally integrated heat exchange system ameliorates several problems associated with operation of a high temperature solid oxide fuel cell system. Optimal performance of an electrochemical fuel cell is realized when the gas composition of reactants and products is near equilibrium. However, as the hydrocarbon fuel is consumed at the anode of the fuel cell, equilibrium of the electrochemical reaction is upset. For this reason, steam reformation of the fuel is used to provide the fuel cell with a high chemical potential fuel. Steam reformation of hydrocarbon fuels is an endothermic process that requires a heat of reaction in excess of 750 C. to achieve complete conversion of the hydrocarbon feed. Traditional process design includes a high temperature reformer unit and associated piping of the process streams. But thermal loses from the reformer unit and associated piping are significant, and most fuel cell systems must burn a portion of the fuel for the exclusive purpose of driving the reformer.

In contrast, fuel preheat and steam reformation in the thermally integrated heat exchange system takes place in catalyst loaded tubes inside the furnace enclosure. The heat of reaction for the reformation process may be supplied directly from heat released by the fuel cell stack. The cost of installing and maintaining a high temperature reformer unit and associated piping is eliminated, along with the associated exchange of thermal energy to the environment.

Fuel cell operation is optimized when the steam to carbon ratio in the steam reformation process is minimized. Low steam to carbon ratio yields a dry, CO rich fuel stream that has a buffering effect on the fuel potential. The CO consumes the water produced in the fuel cell electrochemical reaction to produce $CO_2$ and hydrogen, the reformed fuel. However, a low steam to carbon ratio also increases the risk of carbon formation, or coking, which results in carbon deposits. Coking is typically not a problem in the fuel cell because oxygen is being added to the fuel stream by the cell electrochemical reactions, thus continuously increasing the steam to carbon ratio of the fuel. The cell operating temperature (800-100 C.) is also considerably higher than the temperature at which the thermodynamic affinity for carbon formation is greatest (about 570 C. for methane, and lower for higher hydrocarbons). However, the thermodynamic affinity for carbon formation is higher for a gas composition which is not in equilibrium with respect to all gas components than for an equilibrium composition. This is the situation in a conventional fuel preheater and reformer where unreformed fuel is first heated and then reformed in the fuel cell. Thus, the greatest risk of coking occurs in the fuel preheater at the point where the unreformed fuel is about 570 C.

In contrast, fuel is reformed in the thermally integrated heat exchange system as it is preheated to cell temperature. The fuel reforming process is directly radiation and convection coupled to the fuel cell stacks, which allows independent optimization of preheating and fuel reformation subsystems. The reformer tubes may be fitted with insulation and radiation shields to effect an optimal temperature progression through the catalyst bed. This allows matching of the heating rate with the fuel reforming reaction rate, thus keeping the gas composition near equilibrium from feed temperature to cell temperature. Direct radiation and convection coupling delivers high electrochemical potential pre-reformed fuel for maximum cell performance coupled with reduced risk of carbon formation.

Heat exchangers particularly suited for use with the thermally integrated heat exchange system are also disclosed. The heat exchangers include incoming and exhaust gas flow passageways that are substantially thermally integrated along their length. Thermal energy from a hot exhaust gas stream may be exchanged with a cooler incoming reactant gas stream along the thermally integrated length of the passageways. In a preferred embodiment, exhaust gases and incoming gases flow through the heat exchangers in opposite directions. The heat exchangers are preferably generally cylindrical in shape to enable the solid oxide electrolyte plates of an ion conducting device to be disposed within the volume of the cylinder.

A screw culvert embodiment of a heat exchanger has helical shaped gas flow passageways that provide a comparatively longer pathway for gases flowing through the heat exchanger. This advantage results in greater heat exchange efficiency between fluids coupled with a more compact heat exchanger. A plate fin embodiment of a heat exchanger has a plurality of gas flow chanhels separated by fins that provide substantial surface area for heat exchange.

The heat exchanger embodiments are efficient from a weight and volume standpoint, and can meet requirements for high thermal performance coupled with low pressure drop through the gas flow passageways. The simple design means fewer components to manufacture, assemble and insulate. The compact design also means that a smaller total area is exposed to heat loss which translates to improved thermal efficiency.

A better understanding of the thermally integrated heat exchange system and the heat exchangers intended for use with the system may be had from the following drawings and detailed description of the illustrated embodiment.

DETAILED DESCRIPTION OF THE ILLUSTRATED EMBODIMENT

Figure 1:
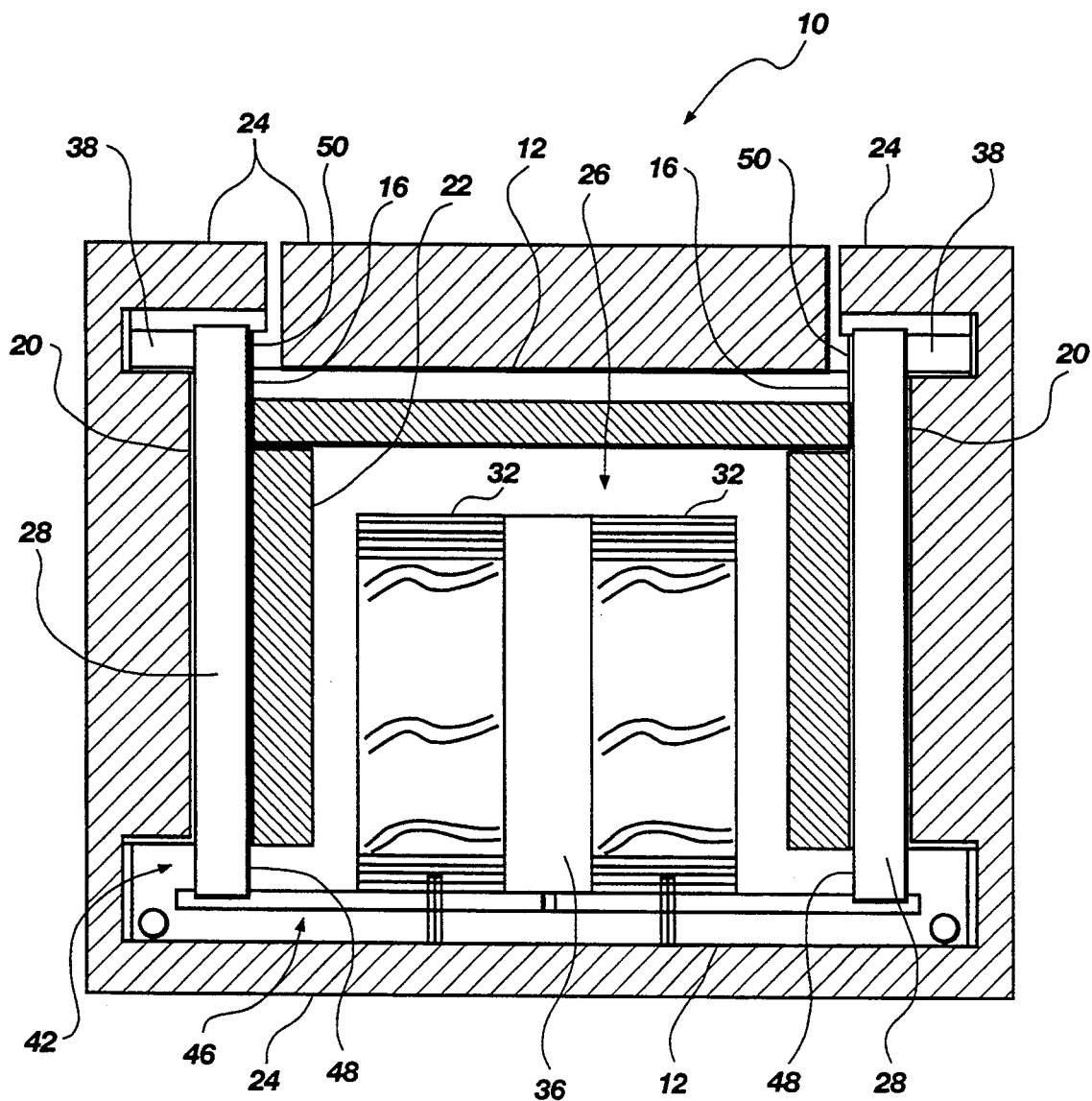
FIG. 1 is cross sectional view of a preferred embodiment of a thermally integrated heat exchange system of the instant invention.

Referring to FIG. 1, a preferred embodiment of a thermally integrated heat exchange system 10 for a solid oxide based electrolyte system includes a furnace enclosure structure 12 having inner walls 16 and outer walls 20 associated respectively with inner thermal insulation 22 and external thermal insulation 24. Inner and outer walls 16 and 20 substantially surround and enclose an interior chamber 26 inside the furnace enclosure structure 12. A plurality of spaced apart solid oxide electrolyte plates 32 are disposed within the interior chamber 26.

A heat exchanger 28 for preheating incoming gases is embedded in the furnace enclosure structure 12 between inner and outer furnace walls 16 and 20, and likewise between inner thermal insulation 22 and external thermal insulation 24. Heat exchanger 28 has an incoming gas passageway and an exhaust gas passageway therein (neither illustrated in FIG. 1) that will subsequently be described in more detail regarding specific preferred embodiments of the heat exchanger.

In a preferred embodiment of the thermally integrated heat exchange system, incoming gases enter the incoming gas passageway through an incoming gas inlet 38, and are preheated as they flow through the heat exchanger 28. The preheated incoming gases exit the heat exchanger through an incoming gas outlet 42, and flow through a plenum 46 that connects the incoming gas passageway to a manifold 36. The manifold 36 directs and delivers the preheated incoming air to flow through the electrolyte plates 32. In a preferred arrangement, the electrolyte plates are arranged around the periphery of manifold 36, and preheated incoming gases are dispensed radially outward from the manifold to the electrolyte plates.

Most of the chemical potential of the incoming reactant gases is consumed in an electrochemical reaction at the electrolyte plates, which raises the temperature of the gases. The spent exhaust gases enter the exhaust gas passageway in heat exchanger 28 through exhaust gas inlet 48, where thermal energy from the hot exhaust gases is exchanged with the cooler incoming gases. The exhaust gases exit the exhaust gas passageway through an exhaust gas outlet 50. Alternatively, the exhaust gases may be burned inside the furnace enclosure to consume any remaining chemical potential and provide additional thermal energy for the high temperature processes associated with operation of a solid oxide electrolyte system.

Fuel preheat and steam reformation in the thermally integrated heat exchange system may take place in catalyst loaded tubes (not shown) inside the furnace enclosure. The fuel may be reformed as it is preheated to cell temperature with the heat of reaction for the reformation process supplied directly from heat released by the fuel cell stack. The fuel reforming process is thus directly radiation and convection coupled to the fuel cell stacks, which allows independent optimization of preheating and fuel reformation subsystems. The reformer tubes may also be fitted with insulation and radiation shields (not shown) to effect an optimal temperature progression through the catalyst bed. This allows matching of the heating rate with the fuel reforming reaction rate, thus keeping the gas composition near equilibrium from feed temperature to cell temperature. Since the fuel reformation means is disposed within the furnace enclosure, exchange of thermal energy to the environment associated with conventional fuel processing systems is substantially reduced in the thermally integrated heat exchange system.

Figure 2:
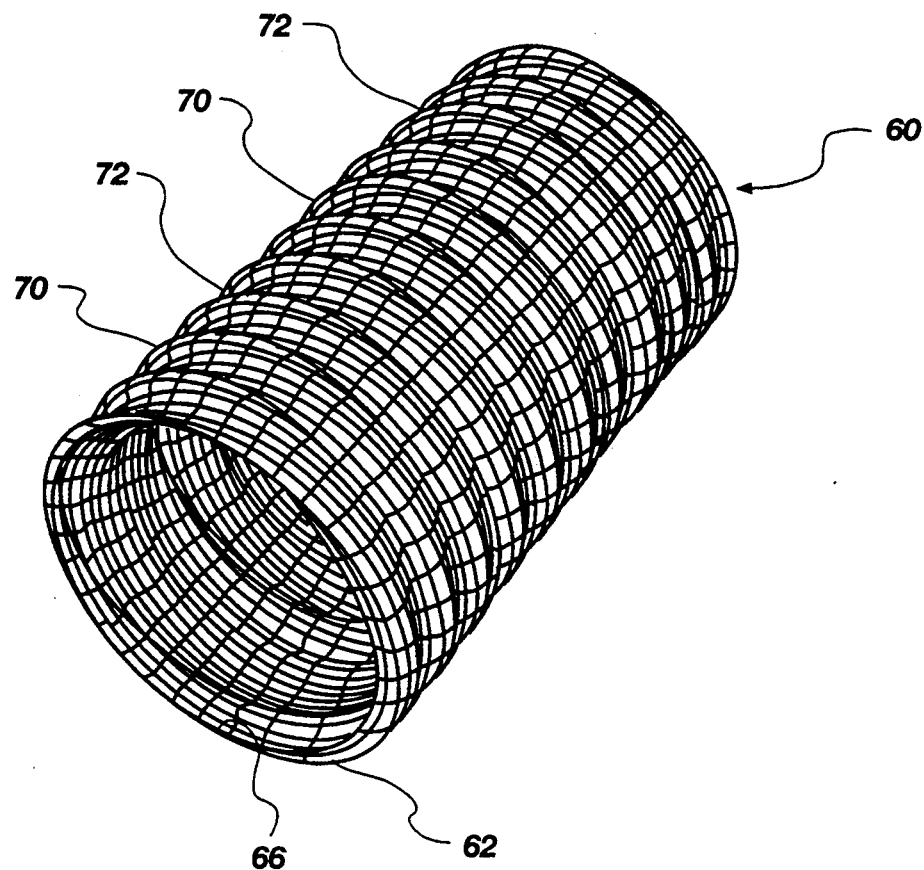
FIG. 2 is a perspective view of a screw culvert heat exchanger suited for use with the thermally integrated heat exchange system.
Figure 3:
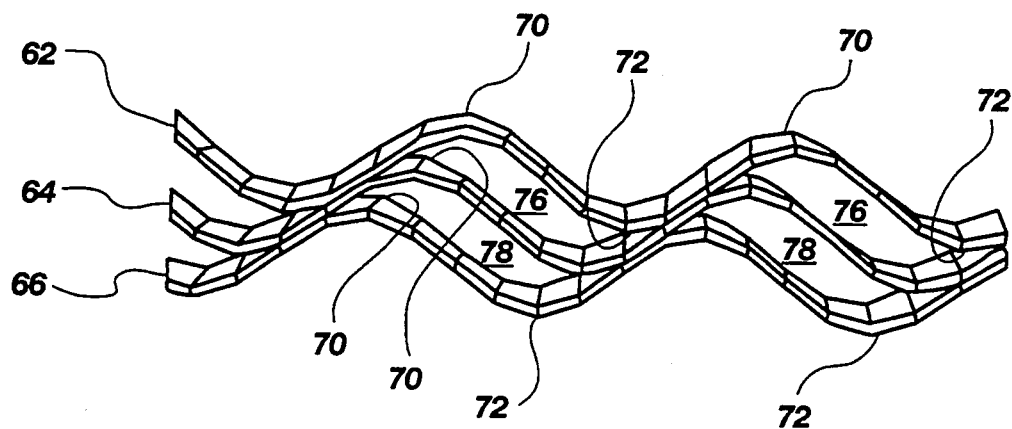
FIG. 3 is a longitudinal cross sectional view of a portion of the screw culvert heat exchanger in FIG. 2.
Figure 4:
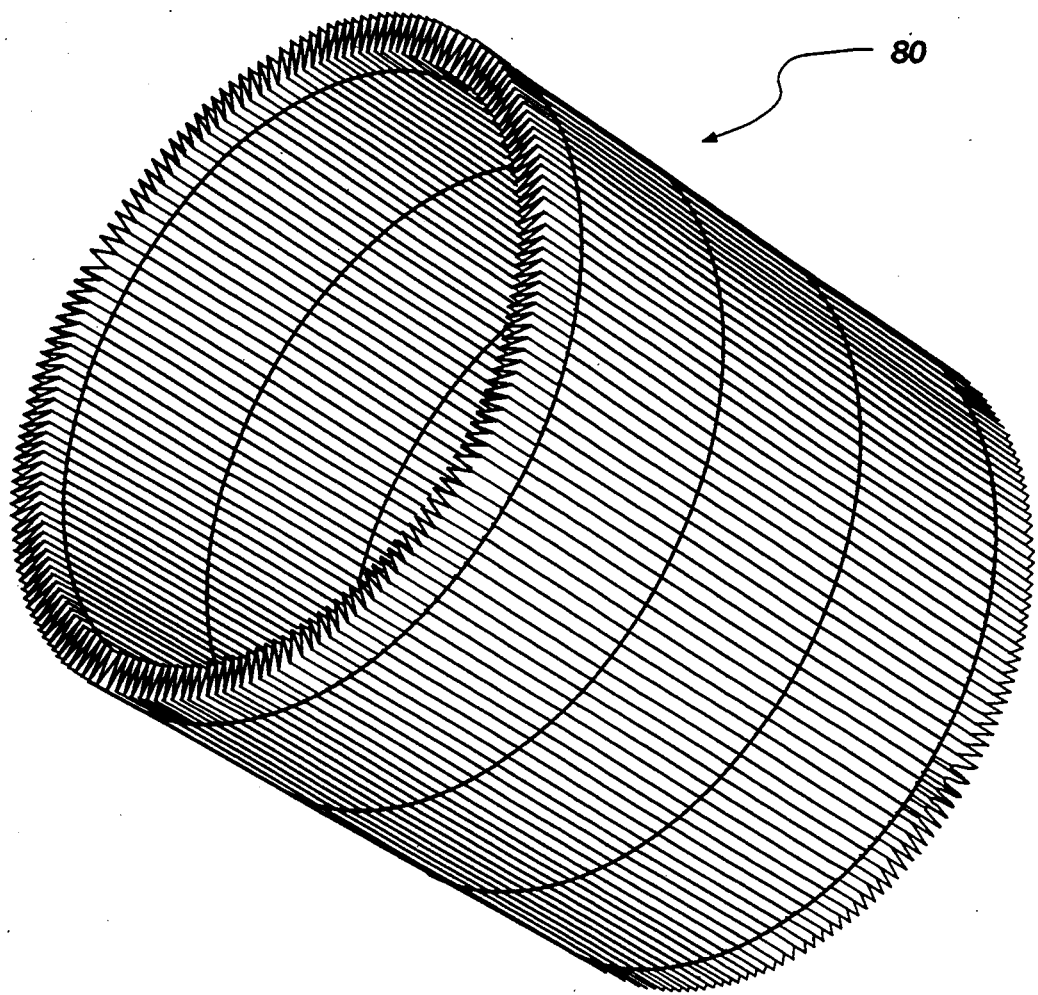
FIG. 4 is a perspective view of a plate fin heat exchanger suited for use with the thermally integrated heat exchange system.
Figure 5:
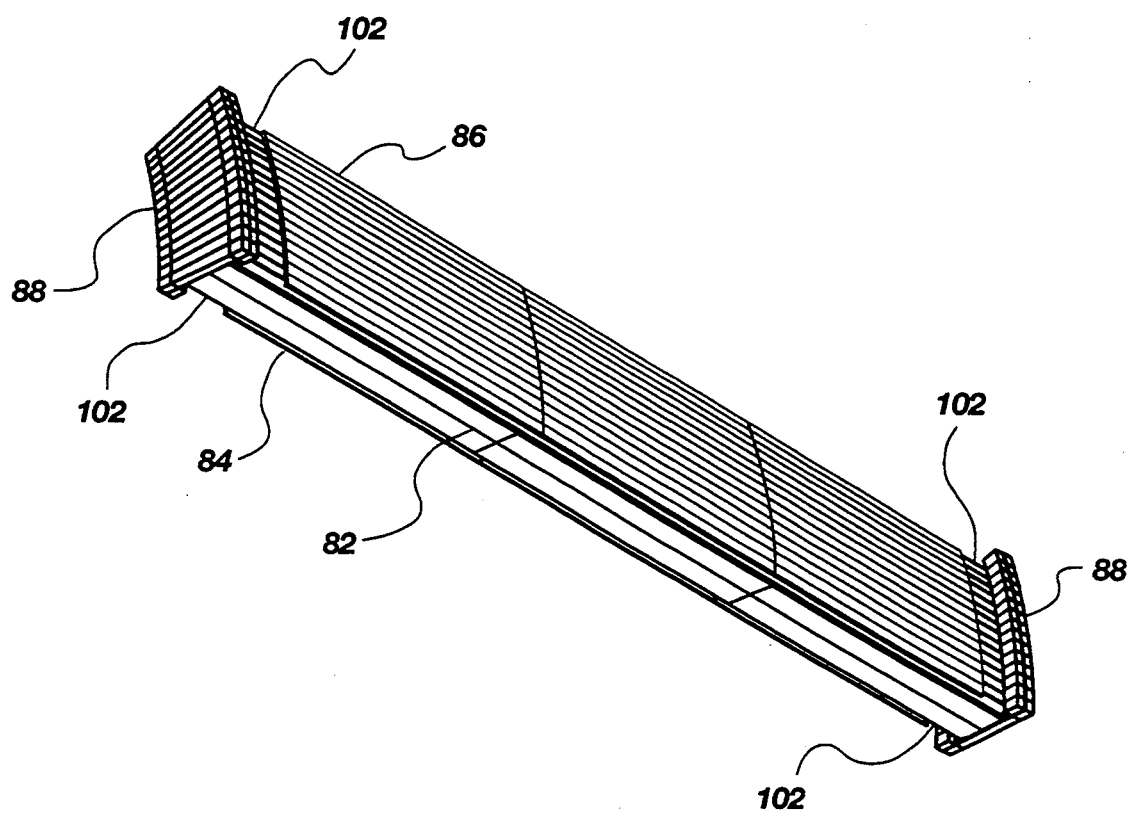
FIG. 5 is a perspective view of a section of the heat exchanger in FIG. 4.
Figure 6:
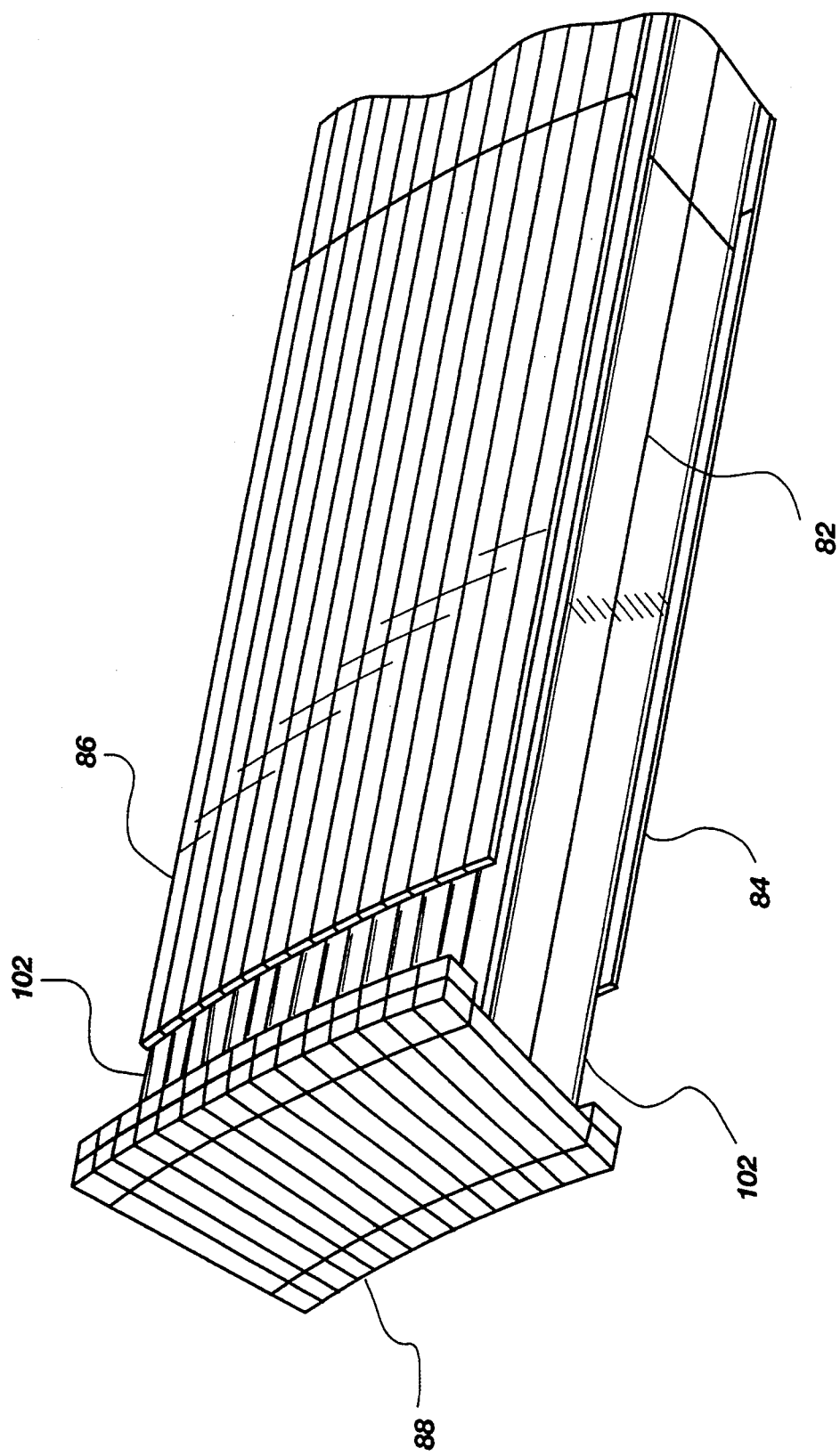
FIG. 6 is an enlarged perspective view of one end of the heat exchanger section in FIG. 5.

Referring now to FIGS. 2 and 3, a screw culvert heat exchanger 60 particularly suited for use with the thermally integrated heat exchange system includes first, second and third culverts 62, 64, and 66 respectively. Screw culvert heat exchanger 60 will have an average diameter ranging from one to four feet, and will be constructed of a high temperature alloy such as Inconel.

As best illustrated in FIG. 3, each of corrugated culverts 62, 64, and 66 has a corrugated inner and outer surface which periodically enlarges to a greatest diameter at the outer surface corrugation ridges indicated with reference numeral 70, and constrict to their least diameter at the inner surface corrugation ridges indicated by reference numeral 72. As best illustrated in FIG. 2, the corrugations are formed as a spiral resembling a coarse screw thread which spirals from end-to-end around both the inner and outer surfaces of each of culverts 62, 64, and 66.

First culvert 62 has a diameter larger than the diameter of second culvert 64 and is disposed coaxially around it. Likewise, second culvert 64 has a diameter larger than the diameter of third culvert 66 and is disposed coaxially around it in similar fashion. As illustrated in FIG. 2, the resulting coaxially assembled structure resembles a single culvert pipe having a spiral corrugation which spirals from end-to-end resembling a coarse screw thread on both the outer-most surface and the inner-most surface. Although three culverts are illustrated as comprising the coaxial assembly in FIGS. 2 and 3, any number of culverts greater than two may be included to suit the requirements of certain applications.

The culverts 62, 64, and 66 are rotated with respect to each other so that the corrugations on adjacent culverts are positioned out of phase with each other. The difference in the diameter between adjacent culverts, for example the first and second culverts, is such that the second culvert cannot be completely rotated within the first culvert. Rather, first culvert 62 is rotated so that the least diameter 72 on the inner surface of its corrugation contacts and binds on the greatest diameter 70 on the outer surface of the corrugation on second culvert 64. Likewise, second culvert 64 is rotated so that the least diameter 72 on the inner surface of its corrugation contacts and binds on the greatest diameter 70 on the outer surface of the corrugation on third culvert 66.

An incoming gas passageway 76 is formed between the first culvert 62 and the second culvert 64 due to the difference in diameter between the two culverts. Incoming gas passageway 76 is helical in shape because it comprises the volume between the interior corrugated surface of first culvert 62 and the exterior corrugated surface of second culvert 64. Incoming gas passageway 76 is open at each end but is enclosed along the length of its helical path between culverts 62 and 64 because of the binding of the corrugations against each other. Similarly, an exhaust gas passageway 78, also helical in shape, is formed in the volume between the second and third culverts 64 and 66 respectively. Helically shaped incoming and exhaust gas passageways 76 and 78 extend in a helical or spiral path through a series of planes from one end to the other around the circumference of the screw culvert heat exchanger 60.

Exchange of thermal energy occurs between gases flowing through the gas passageways of the screw culvert heat exchanger 60. As illustrated in FIG. 3, the wall of second culvert 64 separates gases flowing through the incoming and exhaust gas passageways. Exchange of thermal energy across the wall may occur when the gases on opposite sides are at different temperatures. Exchange of thermal energy is enhanced by the flattened cross sectional shape of the gas passageways which increases the surface area available for thermal exchange. The helical shaped gas passageways are also significantly longer than a straight gas path per unit axial length of the heat exchanger which also enhances thermal exchange.

The open ends of the gas passageways 76 and 78 may be furnished with fittings to connect the passageways to gas supply or collection piping. For example, spent air exhaust gas from a SOFC disposed within the interior of the cylindrical heat exchanger is directed to flow through the exhaust gas passageway, and incoming air is directed to flow in the opposite direction through the incoming gas passageway. Thermal exchange of energy may occur between the hot exhaust gases and the cooler incoming gases along the length of the gas passageways. Radiant and convection heat from the electrochemical combustion reaction occurring in an operational SOFC within the interior of the heat exchanger may also be utilized for thermal exchange with the incoming gases.

A significant advantage to helical shaped gas flow passageways is that hot and cold regions within the heat exchanger cannot "see" each other because the gases travel spirally around the circumference of the heat exchanger. By "see" is meant that the radiation view factors between hot and cold ends of the heat exchanger are non-zero. This reduces radiant heat transfer from the hot regions to the cold regions which lowers the amount of heat required at the hot end. In SOFC cogeneration applications, the temperature of the waste heat available for co-generation is also raised because a lower temperature difference is required to preheat the incoming air.

Referring now to FIGS. 4–7, a generally cylindrical plate fin heat exchanger 80 particularly suited for use with the thermally integrated heat exchange system includes a corrugated heat exchanger core 82 sandwiched between inner and outer face sheets 84 and 86 respectively. A pair of end caps 88 cover the ends of the heat exchanger core. The plate fin heat exchanger S0 will have an average diameter ranging from one to four feet, and will be constructed of a high temperature alloy such as Inconel.

Figure 7:
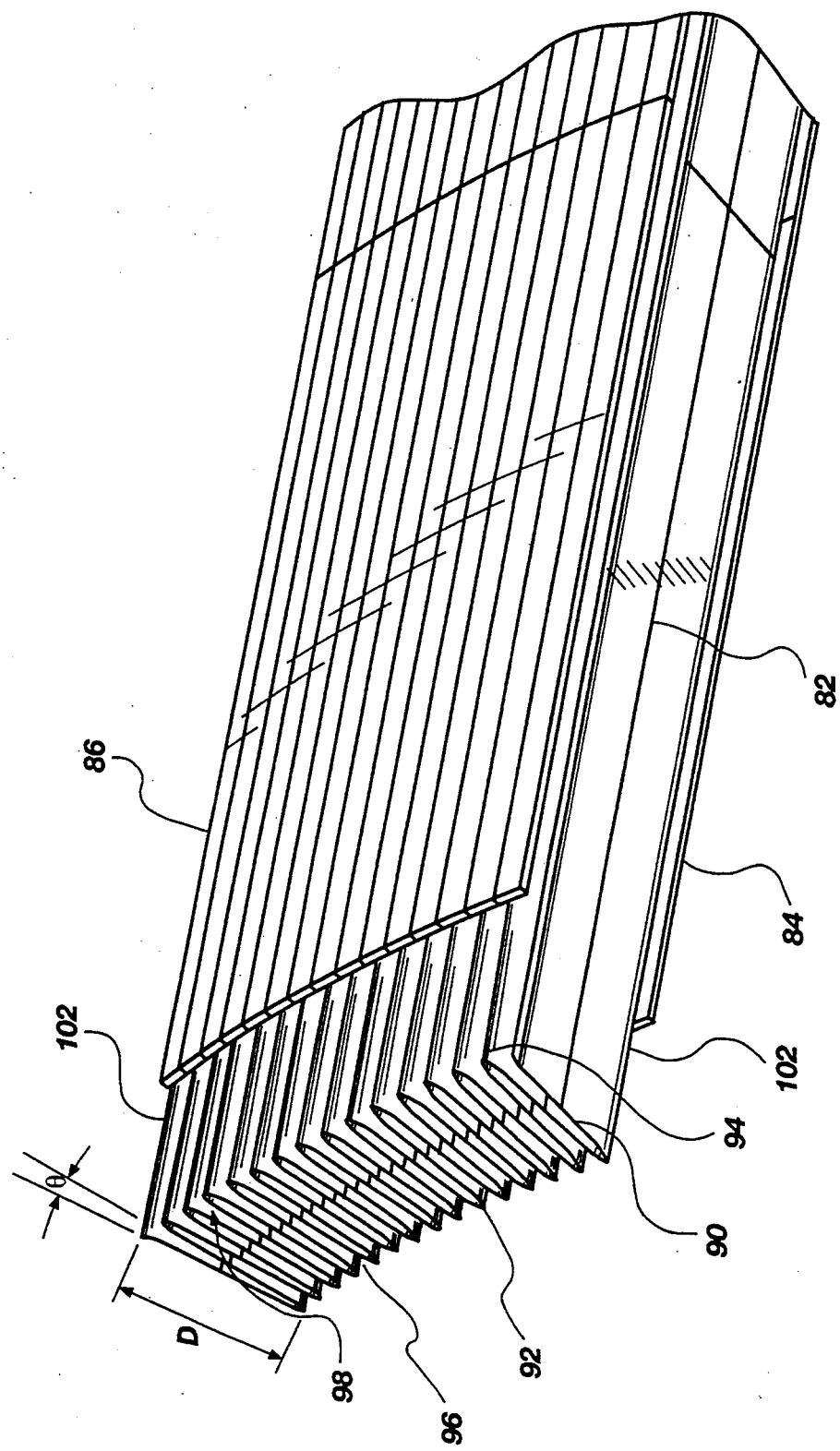
FIG. 7 is an enlarged perspective view of the heat exchanger section in FIG. 6 with one end cap removed to illustrate the gas flow passageways.

As best illustrated in FIG. 7, the heat exchanger core 82 is a generally cylindrical corrugated sheet having a plurality of periodic corrugations 92 and 94 therein, and a plurality of fins 90 extending between consecutive corrugations. Each corrugation extends along the length of the heat exchanger core resulting in a finned structure having a thickness D and a cross sectional resemblance to a cardboard box or an aircraft "sine web spar". A thicker or thinner core may be obtained by adjusting the distance D between corrugations or the angle $\theta$ between adjacent fins.

Inner face sheet 84 is a generally cylindrical sheet that covers the inner-most corrugations 92 on the inner surface of the heat exchanger core 82. The inner face sheet may be constructed from a plurality of sections that fit together into a generally cylindrical structure having an outside diameter substantially corresponding to the inside diameter of the generally cylindrical heat exchanger core 82. Similarly, outer face sheet 86 is a generally cylindrical sheet that covers the outer-most corrugations 94 on the outer surface of the heat exchanger core 82.

An incoming gas passageway and an exhaust gas passageway are formed between the fins of the heat exchanger core 82 when the core is sandwiched between the inner and outer face sheets 84 and 86. As best illustrated in FIG. 7, a plurality of inner core channels 96 that open inwardly are formed between the fins 90 diverging from adjacent corrugations 92 on the inner surface of the heat exchanger core 82. Similarly, a plurality of outer core channels 98 that open outwardly are formed between the fins 90 diverging from adjacent corrugations 94 on the outer surface of the heat exchanger core. In a preferred embodiment, the incoming gas passageway may comprise the outer core channels and the exhaust gas passageway may comprise the inner core channels. Alternatively, the incoming gas passageway comprises the inner core channels 96 which are covered by the inner face sheet 84, and the exhaust gas passageway comprises the outer core channels 98 which are covered by the outer face sheet 86.

The ends of the incoming and exhaust gas passageways are adapted to provide an inlet and outlet for gases flowing through the passageways. In the illustrated embodiment, end caps 88 cover the ends of the channels, and fluid access to the channels is provided through manifold margins 102 at ends of the heat exchanger. The manifold margins 102 are portions at each end of the heat exchanger where the inner and outer face sheets do not extend to the ends of the gas passageways. Gas manifolds may be installed over the margins for delivery and collection of gases to and from the gas passageways. In an alternate embodiment, the inner and outer face sheets extend to the ends of the passageways, and manifolds are installed over the ends of the passageways.

Gases flowing through the incoming and exhaust gas passageways are substantially thermally integrated with each other through the fins 90 extending along the length of the heat exchanger core. Since the inner and outer core channels 96 and 98 alternate around the circumference of the heat exchanger, substantially all of the surface area of each gas passageway is available for exchange of thermal energy with adjacent channels. Thermal energy in hot exhaust gases flowing through the exhaust gas passageway may be used to preheat cooler incoming gases flowing through the incoming gas passageway.

Although the thermally integrated heat exchange system and associated heat exchanger have been described with a certain degree of particularity in structure, reference herein to details of the illustrated embodiments has been make by way of example only, and numerous changes in structural details may be resorted to without departing from the scope of the following claims.

What is claimed is:

1. A thermally integrated heat exchange system for a solid oxide based ion conducting system, comprising:

a furnace enclosure structure having an interior chamber substantially enclosed by thermally insulated walls;

a plurality of spaced apart solid oxide electrolyte plates disposed within said interior chamber, said plates arranged to permit fluid flow of incoming reactant gases therebetween;

a heat exchanger associated with said thermally insulated walls for preheating said incoming reactant gases, said heat exchanger having an incoming gas passageway therein in fluid communication with a source of incoming gas and with said spaced apart electrolyte plates, and an exhaust gas passageway therein in fluid communication with said spaced apart electrolyte plates;

a manifold disposed within said furnace enclosure for directing said incoming reactant gases to flow from said incoming gas passageway to said electrolyte plates, and for directing said exhaust gases to flow from said electrolyte plates to said exhaust gas passageway; and external thermal insulation substantially surrounding said furnace enclosure structure.

2. The thermally integrated heat exchange system in claim 1 wherein said heat exchanger is a screw culvert heat exchanger comprising a plurality of elongated culverts, each having an inner surface, an outer surface, and a length and having spiral corrugations resembling a coarse screw thread in said inner and outer surfaces extending along said length, said culverts each having a diameter which varies incrementally in size from culvert to culvert, said culverts arranged coaxially from the smallest diameter culvert to the largest diameter culvert one within the other and rotated one within the other such that said spiral corrugations on adjacent culverts are out-of-phase with each other and run up against one another and bind together in an interference fit, and wherein said incoming gas passageway and said exhaust gas passageway in said heat exchanger are helical shaped channels formed in said corrugations between adjacent culverts.

3. The thermally integrated heat exchange system in claim 1 wherein said heat exchanger is a plate fin heat exchanger comprising a generally cylindrical corrugated core having an inner corrugated surface with a plurality of inner core channels therein, an outer corrugated surface with a plurality of outer core channels therein, and having a thickness and a length, said inner and outer corrugated surfaces covered along said length by inner and outer face sheets respectively, and wherein said incoming gas passageway and said exhaust gas passageway comprise said inner core channels covered by said inner face sheet and said outer core channels covered by said outer face sheet.

4. The thermally integrated heat exchange system in claim 1 wherein said incoming gas passageway and said exhaust gas passageway are substantially thermally integrated along their length with substantial surface area available for transfer of thermal energy from an exhaust gas in said exhaust gas passageway to an incoming gas in said incoming gas passageway.

5. The thermally integrated heat exchange system in claim 1 wherein an incoming gas in said incoming gas passageway and an exhaust gas in said exhaust gas passageway flow in opposite directions through said heat exchanger.

6. A thermally integrated heat exchange system for a solid oxide fuel cell comprising:
  a furnace enclosure structure having an interior chamber substantially enclosed by thermally insulated walls;
  a plurality of spaced apart solid oxide fuel cell plates disposed within said interior chamber, said plates arranged to permit fluid flow of incoming reactant air and reactant fuel gases therebetween;
  a heat exchanger associated with said thermally insulated walls for preheating said incoming air destined to flow through said fuel cell plates, said heat exchanger having an incoming air passageway with an incoming air inlet in fluid communication with a source of incoming air and an incoming air outlet in fluid communication with said fuel cell plates, and an exhaust air passageway with an exhaust air inlet in fluid communication with said fuel cell plates and an exhaust air outlet;
  manifold means disposed within said furnace enclosure for directing said incoming air from said incoming air passageway to said fuel cell plates, and for directing exhaust air from said fuel cell plates to said exhaust air passageway;
  fuel preheating and reformation means thermally integrated with said interior chamber of said furnace enclosure for preheating incoming fuel gases destined to flow through said fuel cell plates and for reforming fuel gases to flow through said fuel cell plates; and thermal insulation substantially surrounding said furnace enclosure structure.

7. The thermally integrated heat exchange system in claim 6 wherein said heat exchanger is a screw culvert heat exchanger comprising a plurality of elongated culverts each having an inner surface, an outer surface, and a length and having spiral corrugations resembling a screw thread in said inner and outer surfaces extending along said length, said culverts each having a diameter which varies incrementally in size from culvert to culvert, said culverts arranged coaxially from the smallest diameter culvert to the largest diameter culvert one within the other and rotated one within the other such that said spiral corrugations on adjacent culverts are out-of-phase with each other and run up against one another and bind together in an interference fit, and wherein said incoming air passageway and said exhaust air passageway are helical shaped channels formed in said corrugations between adjacent culverts.

8. The thermally integrated heat exchange system in claim 6 wherein said heat exchanger is a plate fin heat exchanger comprising a generally cylindrical corrugated core having an inner corrugated surface with a plurality of inner core channels therein, an outer corrugated surface with a plurality of outer core channels therein, and having a thickness and a length, said inner and outer corrugated surfaces covered along said length by inner and outer face sheets respectively, and wherein said incoming air passageway and said exhaust air passageway comprise said inner core channels covered by said inner face sheet and said outer core channels covered by said outer face sheet.

9. The thermally integrated solid oxide fuel cell system in claim 6 wherein said incoming air passageway and said exhaust air passageway are substantially thermally integrated along their length with substantial surface area available for transfer of thermal energy from said exhaust air in said exhaust air passageway to incoming air in said incoming air passageway.

10. The thermally integrated solid oxide fuel cell system in claim 6 wherein said incoming air and said exhaust air flow in opposite directions along said length of said heat exchanger through respective of said incoming air passageway and said exhaust air passageway.

11. The thermally integrated heat exchange system in claim 6 wherein said fuel preheating and reformation means are catalyst loaded tubes disposed within said furnace enclosure structure.

12. The thermally integrated heat exchange system in claim 11 including thermal insulation and radiation shields on said catalyst loaded tubes to effect a predetermined temperature progression through said catalyst bed.

13. The thermally integrated heat exchange system in claim 6 wherein said fuel preheating and reformation means is a steam reformer.

14. The thermally integrated heat exchange system in claim 6 including additional thermal insulation substantially surrounding said furnace enclosure.

* * * * *